March 4, 1969  C. F. CHENOT  3,431,216
EUROPIUM ACTIVATED STRONTIUM HALOBORATE PHOSPHOR
Filed Oct. 11, 1965
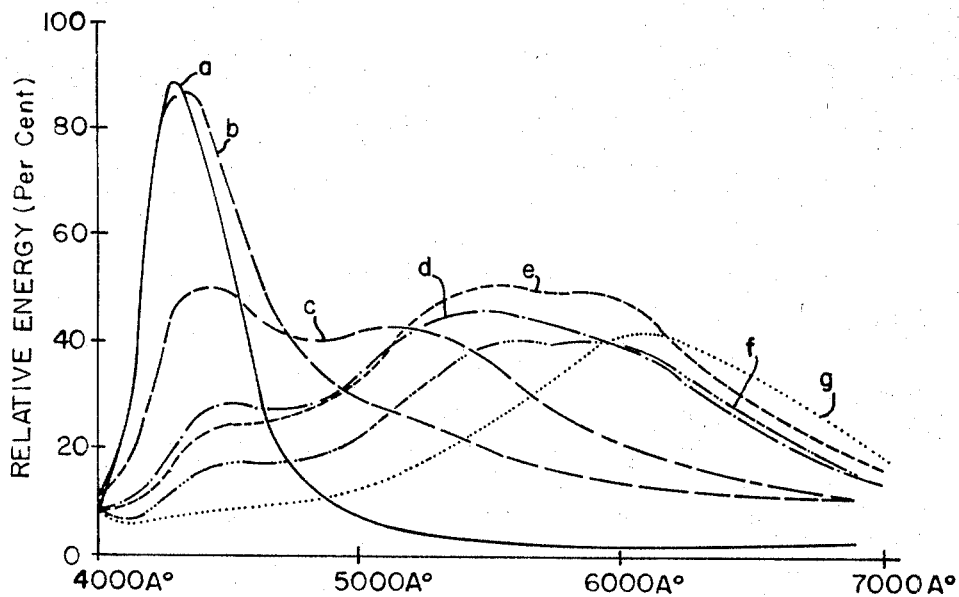
CHARLES F. CHENOT
INVENTOR.
BY
ATTORNEY

United States Patent Office 3,431,216
Patented Mar. 4, 1969

3,431,216
EUROPIUM ACTIVATED STRONTIUM
HALOBORATE PHOSPHOR
Charles F. Chenot, Towanda, Pa., assignor to Sylvania
Electric Products Inc., a corporation of Delaware
Filed Oct. 11, 1965, Ser. No. 494,541
U.S. Cl. 252—301.4
Int. Cl. C09k 1/66, 1/04
6 Claims

ABSTRACT OF THE DISCLOSURE

A europium activated strontium chloroborate or chlorofluoroborate phosphor activated by europium. The phosphor is useful in low pressure or high pressure electric discharge devices and cathode ray tubes.

---

This invention relates to fluorescent phosphors and particularly those which are excited by a high or low pressure mercury discharge or cathode ray bombardment. Specifically, this invention concerns strontium haloborate phosphors activated by europium in its (+2) valence state.

Fluorescent phosphors have been known to the art and strontium borate matrices have previously been used for these purposes. To the best of my knowledge, however, strontium borates (chloride and fluorochlorides) have been activated by europium and particularly, europium in its (+2) valence state.

Several phosphors have been reported which involve some form of the strontium borate matrix. Many of these however, have been activated by lead such as disclosed, for example, in the United States patent of Ranby, No. 2,920,046. Of course, rare earth metals and specifically europium have also been disclosed as activators for phosphors however, not for the herein disclosed matrices.

According to my invention, I have discovered that $Sr_2F_xCl_yB_4O_{6.5}Eu_{0.005}$ to $_{0.05}$ where $x$ is between 0.00 to 0.97, $y$ is between about 0.01 to 0.97 and $z$ is between about 0.90 to 0.99 and the total of $x$ and $y$ is about 0.98 (calculated according to material formulated before firing) produces a phosphor system which emits over a wide range of visible colors. The total ratio of strontium and europium atoms to the borate radical should be substantially stoichiometric.

When a strontium borate matrix is activated by europium in the (+2) valence state, I have discovered that the phosphors emit light in a wide range or visible colors which can be specifically controlled by certain adjustments in the ratio of fluoride to chloride in the molecule and modification of the europium concentration. With particular reference to one of these phosphors, the blue emission achieves peak height measurements of 200% of a standard commercially available, blue emitting phosphor, but has a relatively narrow band emission. Other phosphors in the system show an increase in peak heights over standard phosphors which have similar and comparable emission spectrum characteristics. All phosphors within the ranges stated above have a broad excitation spectrum starting at about 4000 A. and extending into the far ultraviolet. The maximum excitation appears to exist at about 3400 A. Moreover, most of these phosphors, particularly the blue emitting, emit under vacuum discharge conditions and thus can be employed for cathode ray tubes.

Accordingly, the primary object of my invention is the preparation of novel europium activated strontium haloborate phosphors which have broad excitation spectra.

Another object of my invention is the preparation of phosphors which are excited by a high or low pressure mercury discharge and cathode rays.

A feature of this invention is the inclusion of certain halides in certain specific proportions in a strontium borate matrix.

Another feature of my invention is the activation of a strontium haloborate matrix with europium in its (+2) valence state.

Many other objects, features and advantages of my invention will become manifest to those conversant with the art upon reading the following specification when taken in conjunction with the accompanying drawing.

The figure is a graph showing the relative emission energy of various phosphors and the emission spectra with varying relative quantities of fluoride and chloride atoms in the matrix.

In accordance with the principles of my invention, I have discovered that europium in its (+2) valence state and chloride and fluoride atoms can be included in a strontium borate matrix to produce a new phosphor system. In Table I following, the ratio of fluorine and chlorine have been varied for the second step additions to illustrate the various phosphors which can be produced. The second step additions will be explained in Examples I and II. In the figure, emission of the Type $b$ phosphor described in Table I contains a strong peak in the blue to blue-green range. Type $c$ phosphor emits with more green light in the spectrum and so forth following down into Type $g$ which has substantial quantities of yellow. Each of these phosphors were prepared according to the table which follows:

TABLE I.—EUROPIUM-ACTIVATED STRONTIUM FLUOROCHLORO-BORATE PHOSPHORS WITH VARIOUS AMOUNTS OF $SrF_2$ AND $SrCl_2$ FOR SECOND STEP ADDITION

| Type phosphor related in curve in figure I | Wt. percent, $SrF_2$ | Wt percent, $SrCl_2$ | 2nd step addition, F-/Cl-ratio | Luminescence |
|---|---|---|---|---|
| a | | 16.0 | 0/1 | Blue. |
| b | 6.3 | 8.0 | 1/1 | Blue blue-green. |
| c | 7.1 | 7.0 | 9/7 | Blue-green. |
| d | 7.5 | 6.5 | 19/13 | Do. |
| e | 7.9 | 6.0 | 5/3 | Green blue-green. |
| f | 9.5 | 4.0 | 3/1 | Green-yellow. |
| g | 11.0 | 2.0 | 7/1 | Yellow-orange |

With particular reference to the Types $a$ and $b$ phosphor, these materials emit with a very strong line in the blue, and spectra measurements have shown peak heights of 200% of existing comparable standards, but with narrower band emission. The remainder of the variations of the ratio provides a system which emits over a wide range of visible colors and can be specifically controlled by adjusting in the ratio of fluoride to chloride.

I have discovered that the phosphor should be activated by europium in a concentration between about 0.005 to 0.05 gram atoms per mole of $B_2O_{6.5}$ radical. Below 0.005 gram atoms, the phosphor does not emit to its optimum performance and above 0.05 gram atoms, the brightness is reduced and the cost of preparation becomes prohibitive.

The following specific examples are illustrative of techniques which can be used to prepare the phosphor system of my invention. They are merely illustrative examples and are not intended to be limitative upon the claims.

Example I

Strontium nitrate, boric acid, and europium oxide initially dissolved in dilute nitric acid ($Eu_2O_3$) in the form of fine powders are dissolved completely in water at about 70° C. in the following molecular proportions:

$$0.5\ Sr(NO_3)_2 : 4H_3BO_3 : 0.006\ Eu_2O_3$$

A mixture of a 1:1 weight ratio of acetone to ammonium hydroxide is added slowly to the above solution until the complex co-precipitation of a white, fine precipitate is complete and a very basic slurry results. The slurry is cooled to less than 20° C. and the resulting precipitate is filtered and dried.

To the dried precipitate, 0.250 mole $SrCl_2$, is added, followed by grinding and thorough blending. This material is initially fired for 30 minutes at 900° C. in an open quartz crucible under air or light oxidizing conditions. Most efficient phosphors are produced when this first step firing is made to form an oxide-dominant matrix.

Prior to a second firing, a second step addition of 16 wt. percent $SrCl_2$ is added to the first step material, followed by grinding and thorough blending. This material is then fired for 40 minutes at 915° C. in an open quartz crucible under mild reducing conditions, e.g., 10–20% $H_2$ in $N_2$.

The final product exhibits a bright saturated blue luminescence with an emission spectrum illustrated in FIGURE 1, curve *a*.

Example II

Strontium nitrate, boric acid, and europium oxide are dissolved and precipitated as in Example I with those proportions.

To the dried precipitate, 0.250 mole $SrF_2$ is added, followed by grinding and thorough blending. This material is initially fired for 30 minutes at 900° C. in an open quartz crucible under air or light oxidizing conditions.

Prior to the second firing, second step additions of 6.3 wt. percent $SrF_2$ and 8.0 wt. percent $SrCl_2$ are added to the product of the first firing. This material is ground and thoroughly blended and fired as indicated in Example I.

The specific additions of $SrF_2$ and $SrCl_2$ are made in amounts according to weight percent of first step fired material. The examples in Table I indicate a few of the phosphors produced with various amounts of $SrF_2$ and $SrCl_2$ added.

As my invention I claim:

1. A strontium haloborate phosphor activated by europium wherein the halide is chloride or the combination of chloride and fluoride, said europium being in at least sufficient quantities to produce luminescence.

2. The haloborate of claim 1 wherein the europium is in the +2 valence state.

3. A phosphor having the formula $$Sr_2F_xCl_yB_4O_{6.5}:Eu_{0.005 \text{ to } 0.05}$$

wherein the total of $x$ and $y$ is about 0.98 and $z$ is between about 0.90 to 0.99.

4. The composition according to claim 3 wherein $x$ is 0.00 to 0.97 and $y$ is 0.01 to 0.97.

5. The composition according to claim 3 wherein the total of the europium and strontium atoms is substantially stoichiometric with the borate radical.

6. The composition according to claim 5 wherein the europium is in the +2 valence state.

References Cited

Kroger: Some Aspects of the Luminescence of Solids, 1948, page 292, copy in Group 112.

Goldberg: Luminescence of Inorganic Solids, 1966, p. 335, copy in Group 112.

TOBIAS E. LEVOW, *Primary Examiner.*

ROBERT D. EDMONDS, *Assistant Examiner.*